(12) United States Patent
Helzer et al.

(10) Patent No.: US 7,775,424 B1
(45) Date of Patent: Aug. 17, 2010

(54) VARIABLE HEIGHT INTERACTIVE KIOSK

(76) Inventors: Scott C. Helzer, 10021 Leafwood Dr., Tallahassee, FL (US) 32312; Thomas A. Bowermeister, 8135 Blue Quill Trail, Tallahassee, FL (US) 32312; Jason T. Bowermeister, 8135 Blue Quill, Tallahassee, FL (US) 32312

( * ) Notice: Subject to any disclaimer, the term of this patent is extended or adjusted under 35 U.S.C. 154(b) by 58 days.

(21) Appl. No.: 12/229,201

(22) Filed: Aug. 21, 2008

(51) Int. Cl.
*G06F 17/00* (2006.01)
(52) U.S. Cl. ..................................................... 235/375
(58) Field of Classification Search .................. 235/375, 235/379, 380, 385, 386; 248/125.2, 638, 248/651, 669; 211/1.15, 1.57; 108/147; 40/601; 280/35; 705/2–4
See application file for complete search history.

(56) References Cited

U.S. PATENT DOCUMENTS

| | | | |
|---|---|---|---|
| 4,616,218 A * | 10/1986 | Bailey et al. | 361/679.21 |
| 4,963,721 A * | 10/1990 | Kohno et al. | 186/61 |
| 4,969,403 A * | 11/1990 | Schwartz et al. | 108/147 |
| 5,140,581 A * | 8/1992 | Ricciardi | 235/493 |
| 5,348,324 A * | 9/1994 | Trotta | 280/35 |
| 5,715,759 A * | 2/1998 | Lee | 108/20 |
| 2002/0169000 A1* | 11/2002 | King | 455/556 |
| 2004/0186744 A1* | 9/2004 | Lux | 705/2 |
| 2005/0075907 A1* | 4/2005 | Rao | 705/2 |
| 2005/0137942 A1* | 6/2005 | LaFleur | 705/27 |
| 2006/0111941 A1* | 5/2006 | Blom | 705/2 |

* cited by examiner

*Primary Examiner*—Michael G Lee
*Assistant Examiner*—Suezu Ellis
(74) *Attorney, Agent, or Firm*—Peter Loffler

(57) ABSTRACT

A kiosk that allows a user to navigate through a Medicaid process via a touch screen monitor facilitated by an onscreen navigator employing ladder logic. The kiosk has a housing to which a bracket that holds the monitor and a keyboard is attached, the bracket capable of sliding up and down and tilting back and forth. A user initially identifies herself to the system via a card reader and confirms identity via a biometric reader. Once within the system, the user navigates via the monitor through the assistance of an onscreen navigator that is set up using ladder logic. At any point during the process, a counselor may be called via a telephone attached to the housing. Once all data is collected for a user, the internal processor transmits the data to a central server.

17 Claims, 3 Drawing Sheets

VARIABLE HEIGHT INTERACTIVE KIOSK

BACKGROUND OF THE INVENTION

1. Field of the Invention

This invention relates to a kiosk that is field installed and is capable of allowing a person to interact with a program, such as the Medicaid program, or communicate directly with a counselor for the program, so that the person may enroll, change health plans, review benefits, etc., within the program from a remote location.

2. Background of the Prior Art

Currently, when a person is determined to be eligible for Medicaid, that person must complete appropriate enrollment paperwork in order to begin receiving benefits. This requires that the beneficiary make either telephonic contact or face-to-face communicate with an enrollment counselor, wherein the counselor gathers various items of information from the beneficiary, presents various options, such as various managed care organizations for which the beneficiary is eligible, to select from to the beneficiary, and the counselor completes the necessary actions to complete the enrollment process for the beneficiary. If the beneficiary decides to change his or her health care plan, either before the lock-in period or during an open enrollment period, appropriate action is completed by the counselor to enroll the beneficiary.

Typically, the enrollment broker is paid a flat rate per completed enrollment.

This method of enrolling and managing beneficiaries suffers from numerous inefficiencies. As each beneficiary must have a one on one session with a counselor, relatively high staffing levels must be maintained by the entity providing the counselors, whether the entity be a government organization or a third party vendor. Having an appropriate staffing level is extremely expensive, especially in light of the amount of training each counselor must receive and the additional training each counselor receives as updates to the programs are made. As counselors are paid on a flat rate basis, there exists a tendency for counselors to rush through each application in order to maximize cash flow, this being especially true when the counselors are employed by a third party for profit provider. Rushing a beneficiary through the enrollment process tends to leave beneficiaries making less than fully informed choices regarding his or her care plan. Additionally, as the counselors are only human, mistakes tend to happen during application completion. Such mistakes occur for a variety of reasons including simple entry mistakes, such as transposing a number entered, miscommunication between counselor and beneficiary—this is especially problematic when the beneficiary speaks little or no English. Such mistakes delay the already slow process of enrollment of the beneficiary, increase the overall costs to the program, and increase the frustration level for the beneficiary.

Use of computers by the counselors for some or all aspects of the application completion process may relieve some of the above noted problems, yet fails to reduce some of the major drawbacks associated with the enrollment process.

What is needed is an integrated system that relies on technological advances that addresses the above noted shortcomings found in the present method. Specifically such a system must reduce the need for the high cost of maintaining high counselor staffing levels. Such a system must help reduce the mistakes made in applications while increasing the speed with which applications are processed. Such a system must eliminate the tendency to rush a beneficiary through the enrollment process, in order to allow the beneficiary to make informed decisions during the enrollment process.

SUMMARY OF THE INVENTION

The variable height interactive kiosk of the present invention addresses the aforementioned needs in the art by providing a system that relies on technology for a substantial portion of the overall enrollment process. The variable height interactive kiosk relies on computers for the majority of the application process thereby reducing the need for the high cost of maintaining high counselor staffing levels. The variable height interactive kiosk, by using software validation checks, helps reduce the mistakes made during the application process, thereby reducing potential delays in the enrollment process. The variable height interactive kiosk communicates electronically with the agency responsible for the enrollment which greatly increases the speed with which applications are processed and virtually eliminates the potential for physical loss of the application. The variable height interactive kiosk, by being computer based, eliminates the tendency for the system to rush a beneficiary through the enrollment process, allowing the beneficiary to make informed decisions during the enrollment process. The computer based nature of the system also assures that uniform outputs are given for a given set of inputs, for example, the variable height interactive kiosk always gives the full and accurate list of doctors enrolled in a specific managed care organization.

The variable height interactive kiosk of the present invention is comprised of a housing that has a top, a bottom, and at least a front face. A bracket is attached to the housing and is capable of sliding along the front face between the top and the bottom and capable of the front face and the bracket is capable tilting away from and toward the front face. A touch screen monitor and a keyboard are each held within the bracket. A magnetic card swiper is located on the bracket as is a biometric reading device. A processor is located within the housing in communication with the monitor and the keyboard. A software system, comprising a ladder logic interactive video presentation, is resident on the processor, which software system allows navigation through a Medicaid enrollment process (initial enrollment, change of benefits, review of benefits, renew of benefits) by the collection of a data set, such that upon completion of the navigation through the Medicaid entry process, the data set is transferred by the processor to a secure remote site. The sliding of the bracket between the top and the bottom is mechanically assisted by a motor coupled to the bracket. The processor may communicate with the remote site via an air card. The software system uses an onscreen navigator to facilitate the navigation which onscreen navigator employs ladder logic. A telephone is attached to the housing while a camera is located on the bracket. The system may be powered by an appropriate connection with a source of AC electric power via an appropriate wall plug, or the system may be self-sufficient by being run by solar power panel that also trickle down charges a battery. This allows the beneficiary to receive 24 hour counseling and enrollment information,

BRIEF DESCRIPTION OF THE DRAWINGS

Similar reference numerals refer to similar parts throughout the several views of the drawings.

DESCRIPTION OF THE PREFERRED EMBODIMENT

Figure 1:
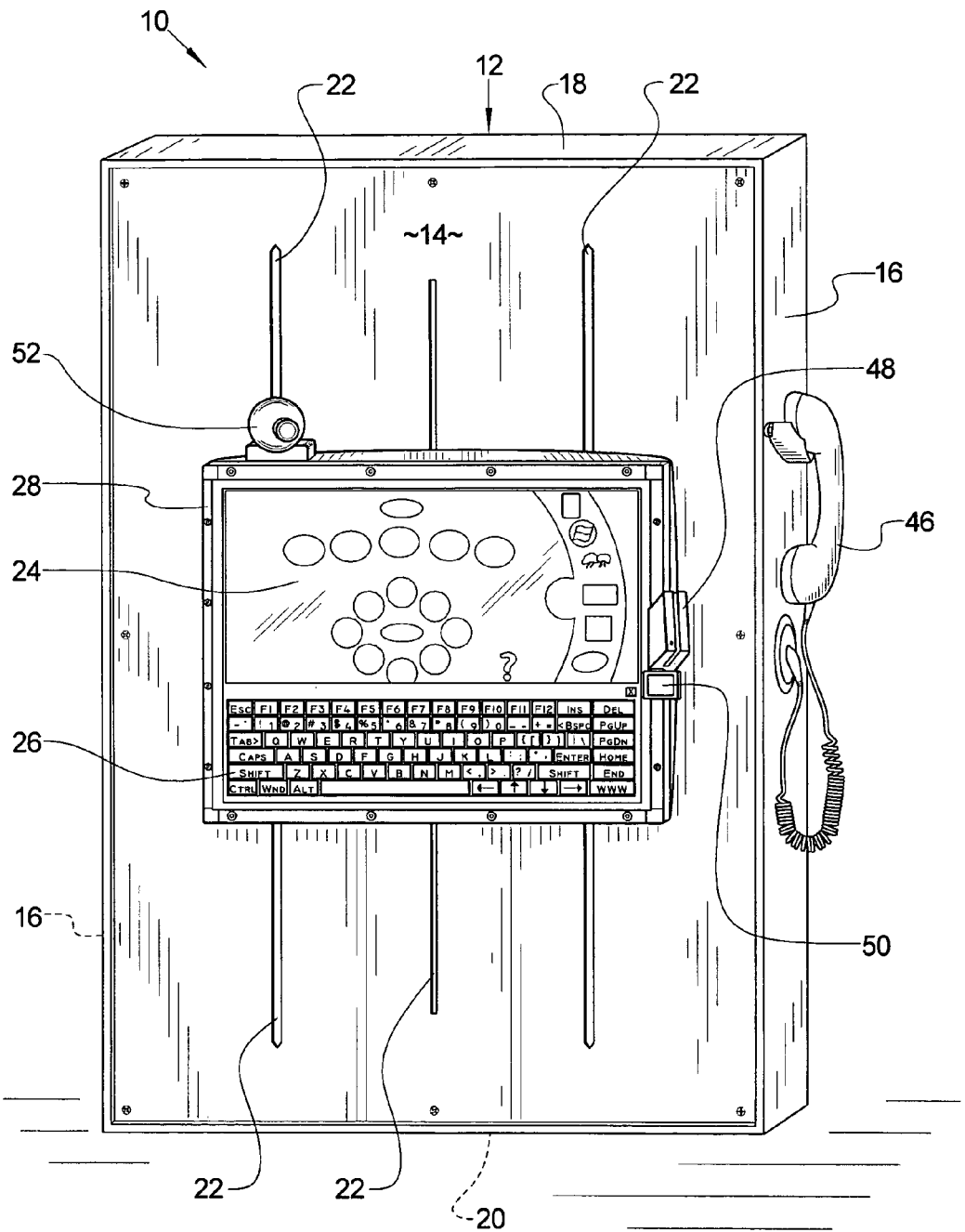
FIG. 1 is a perspective view of the variable height interactive kiosk of the present invention.

Referring now to the drawings, it is seen that the variable height interactive kiosk of the present invention, generally denoted by reference numeral 10, is comprised of a housing 12 made from an appropriate lightweight material, the housing 12 having a front face 14, a pair of side faces 16, a top 18, and a bottom 20 as well as a rear face (not illustrated nor separately numbered). A series of parallel guide slots 22 are located on the front face 14 of the housing 12. A touch screen monitor 24 and a keyboard 26, the two of which may be a single integral unit, or two separate components, are held within a bracket 28, the bracket 28 being able of pivoting toward and away from the front face 14 of the housing 12. The bracket 28 also has a series of pegs (not shown) such that each peg passes through a respective one of the guide slots 22 so that the bracket 28 is capable of sliding between the top 18 and the bottom 20 of the housing 12 guided by the guide slots 22, the pegs being held within the guide slots 22 on the inner side of the front face 14 in an appropriate way so as to prevent the pegs from popping out of their respective guide slots 22 and thus preventing the bracket 28 from detaching from the housing 12. As seen, located within the housing 12 is a drive motor 30 having a drive pulley 32, located on the bottom 20 and a driven pulley 34 located on the top 18 directly above the bottom 20 (these two components 30 and 34 can be reversed, but in order to keep the center of gravity of the device 10 as low as possible, the heavier component, the drive motor 30, is preferably located on the bottom 20). A drive belt 36 or other appropriate linkage passes over the drive pulley 32 as well as the driven pulley 34. One of the pegs attached to the bracket 28 is also attached to the drive belt 36. The drive motor 30 is designed so that it only becomes operational whenever an external rotating force is introduced onto the drive pulley 32 and the motor 30 deactivates when such external force is removed. Accordingly, whenever the height of the bracket 28 is to be changed, the bracket 28 is pushed either up or down which up or down motion transfers to the pegs such that the peg that is connected to the drive belt 36, transfers the up or down force to the drive belt 36 with the drive belt 36 transferring the force to the drive pulley 32, which causes the drive motor 30 to become operational. When up or down movement of the bracket 28 terminates, the up or down force on the pegs terminates, so that the up or down force is no longer being transferred from the peg to the drive belt 36, nor from the drive belt 36 to the drive pulley 32, so that the motor 30 terminates operation. In this manner, the drive motor 30 mechanically assists a person raising or lowering the bracket 28.

Figure 2:
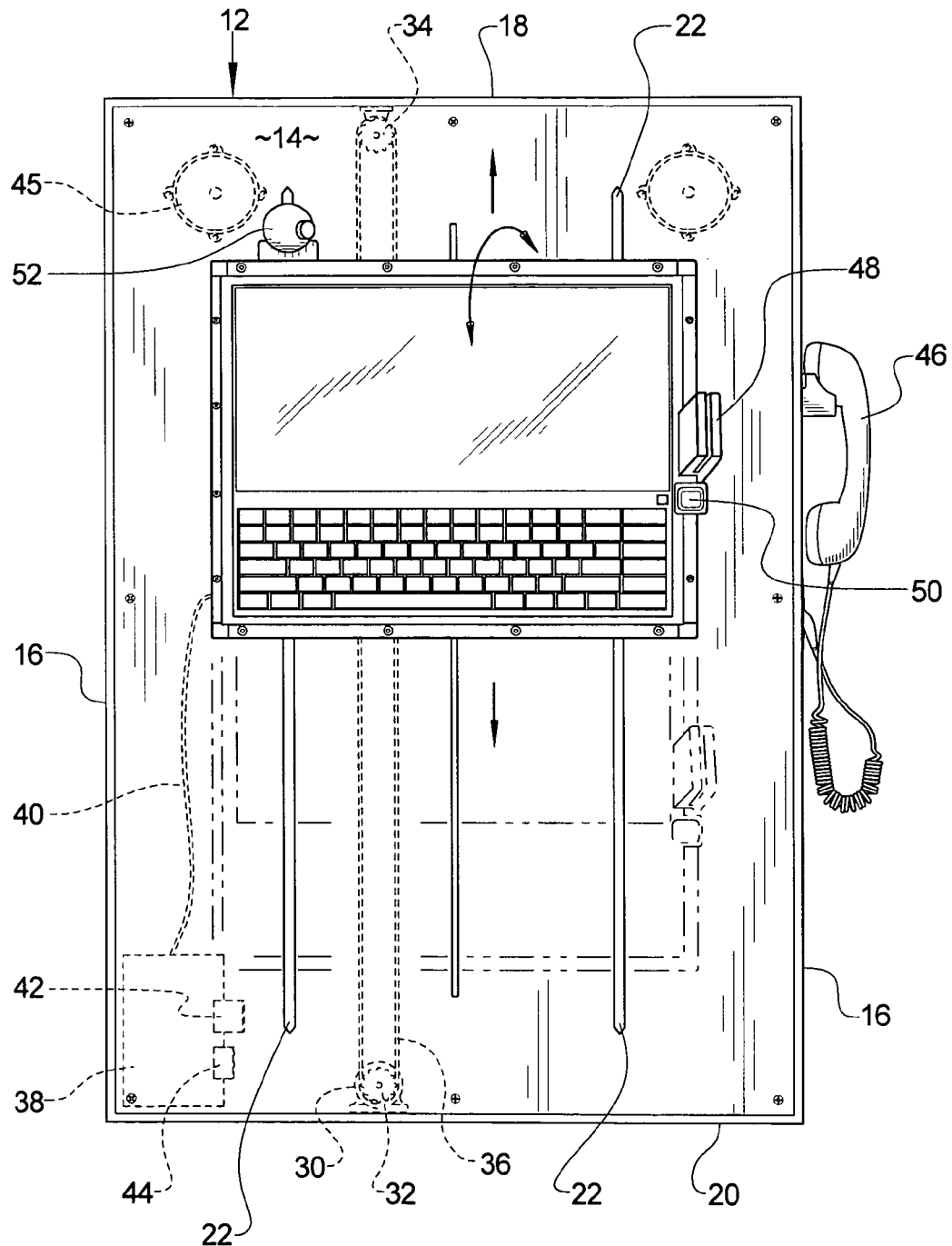
FIG. 2 is an elevation view of the variable height interactive kiosk illustrating the internal components.

As seen in FIG. 2, also located within the housing is a processor 38 which may be any general purpose type of computer and which is in signal communication with the monitor 24 and the keyboard 26 such as by way of the illustrated data cable 40. The processor 38 has an appropriate sound and video card 42 (may be two separate components as opposed to the illustrated single combined component) and also has an air card 44 of any appropriate design in order to allow the processor 38 to be able to communicate with networks, including the Internet, without the need for a fixed cable to be attached to the processor 38. One or more speakers 45 are also located within the housing 12.

Attached to one of the external surfaces of the housing 12 is a telephone handset 46. The telephone connection to the telephone handset 46 may be provided by plugging into a typical active telephone jack (not illustrated). However, in order to make the variable height interactive kiosk 10 more versatile and self-sufficient, the telephone connection is either via a cellular system (not illustrated) located within the housing 12 or via the air card 44 via any appropriate method such as Voice Over Internet Protocol.

Located on the bracket 28 is a card reader 48 of appropriate design as well as a biometric scanner 50, each in signal communication with the processor 38. A camera 52 is also located on the top of the bracket 28 and is also in signal communication with the processor 38.

The processor 38 is loaded with appropriate desired software. The processor 38 may initially come preloaded with the software, or the software may be transmitted to the processor 38 by an appropriate central server, the processor 38 receiving the software via the air card 44. The software is appropriate software that allows pre-approved Medicaid beneficiaries (approved either by the appropriate state agency for that state and/or by the Social Security Administration) to enroll within a Managed Care Organization (MCO), change MCOs during appropriate periods such as open enrollment or before the expiration of a lock-in period, review benefits and participating providers within each MCO, review each MCO in which a particular provider participates. The software also allows a user B to check their enhanced benefits account and to check on changes to their selected health care plan (MCO). The software also allows the user to also apply for Social Security Disability benefits. The software guides the user B through the process, be it enrollment, change, review, etc., via an on-screen facilitator that relies on ladder logic to guide the user B throughout the process. The onscreen facilitator is capable of matching the user's language (without using simultaneous translation), gender, and race as appropriate. The user B can use the telephone handset 46 in order to call a live counselor should the user B get stuck at any point with the counselor having the ability to either verbally guide the user B through the process or remotely take control of the system with the user B present.

Figure 3:
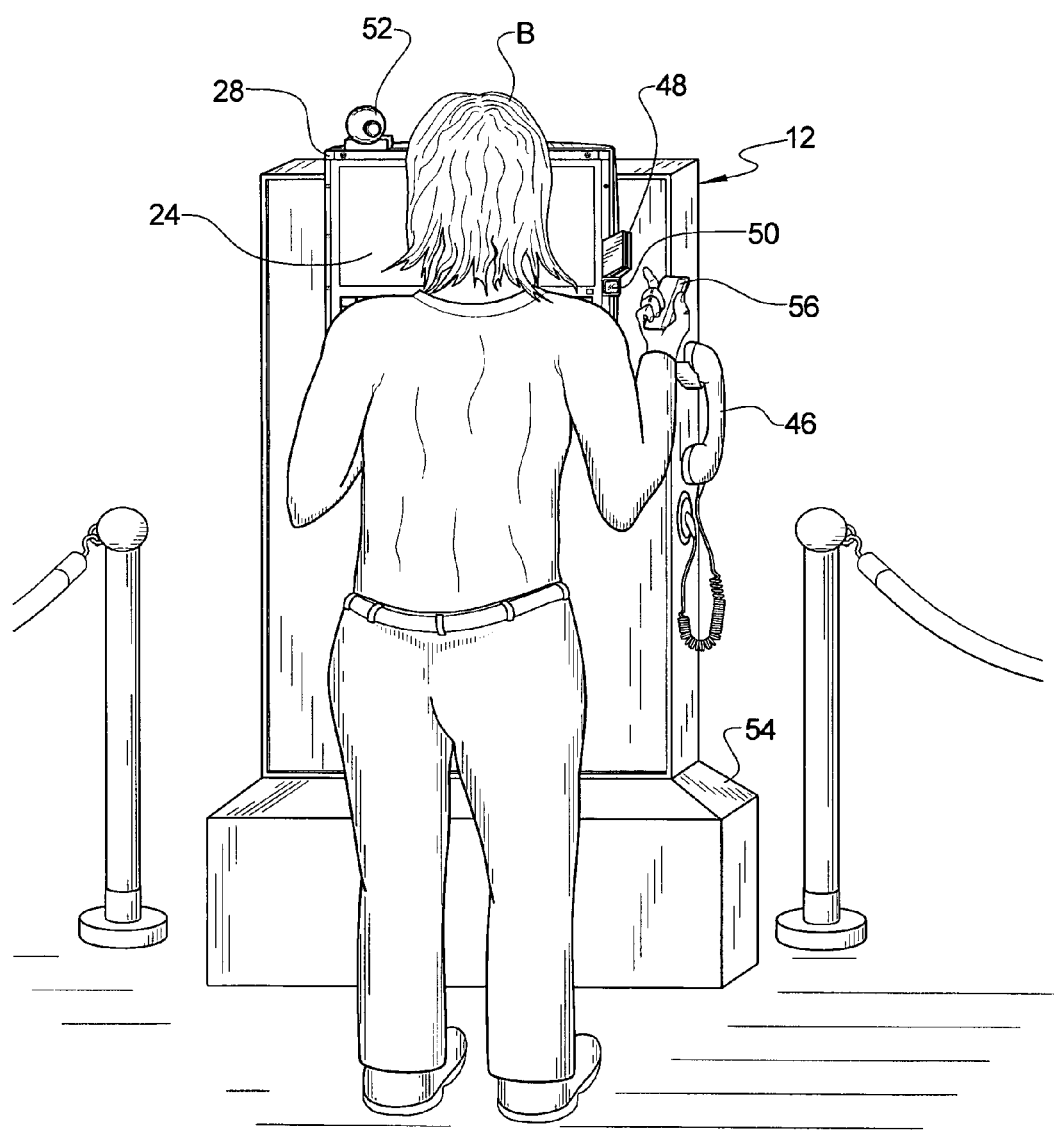
FIG. 3 is a perspective view of the variable height interactive kiosk in use by a beneficiary.

The housing 12 is placed at a desired location, which may be a hospital, including the emergency room in order to allow a user B to quickly check in, a provider's office, a pharmacy, a state office building, or even a large retailer's location that tends to be frequented by a large portion of Medicaid beneficiaries. At the desired location, the housing 12 is placed into a specific location either directly onto the ground or, as seen in FIG. 3, onto a pedestal 54 in order to allow the housing 12 to be of proper height, and the kiosk 10 is plugged into an appropriate source of AC electrical power. Alternately, and advantageously, a battery and solar panel combination are held by the housing 12 so that the solar panel provides electricity to the kiosk 10, either directly or through the battery, with the solar panel also charging the battery. As the kiosk 10 is designed to be placed into a relatively well lit area, appropriate lighting to drive the solar panel is always present. Once the kiosk 10 is powered up, any software, including software updates are transmitted to the processor 38 via the air card 44. Thereafter, the kiosk 10 is operational. A user B approaches the kiosk 10 and moves the bracket 28 either up or down so as to have the monitor 24 and keyboard 26 at a comfortable height. The bracket 28 is tilted for maximum comfort, this being especially important to a wheelchair bound user. The user B activates the software system by swiping an appropriate beneficiary card 56, currently the Medicaid Gold Card or similar card through the magnetic card reader 48. The user B confirms her identity by passing her finger over the biometric reader 50. If the user B has not previously provided biometric data, the system collects the biometric data initially during the sign in process and associates the collected biometric data with the user's account for subsequent use of the system by the user B. Once the user's identity is confirmed, the user B is capable of using the software system. If the user B lacks her beneficiary card 56, she may input her beneficiary information into the system manually via the keyboard 26. Of course when the system is idle, an introductory screen is present on the monitor 24 advising a potential user of how to begin using the kiosk 10, and may include a language selection button, and may also advise to use the telephone handset 46 if completely confused. Once a user B gains access to the system, the user B navigates through the desired component or components of the system by making selections via the touch screen monitor 24. The user B is guided through the system via an onscreen facilitator that acts as the user's Medicaid counselor. Verbal instructions may also be given to the user B via the speakers 46. Should the user B become stuck or confused at any point, the user B picks up the telephone handset 46 and is connected, both via audio and video, to a live counselor, the processor 38 helping route the call to a counselor that is capable of speaking the same language (if other than English) as the user B, if such a counselor is available. The camera 52 allows the counselor to be able to see the user B, and the system may allow for a pop up box to appear on the screen 24 in order to allow the user B to see the counselor, as this may put many users B more at ease.

As the user B progresses through the system, the data collected from the user B is stored on an appropriate storage device (not separately illustrated) of the processor 38. Once the user B completes the transaction, and the system has gathered all the necessary data from the user B a confirmation number is issued to the user B, which confirmation number may also be sent to the user's e-mail account should the user B have such an account and has the account registered with the system. If desired, the kiosk 10 may have a printer (not illustrated) that can give the user B a physical copy of the confirmation. Once the transaction is complete, the data collected is transferred to a central server of either the appropriate government agency or a third party vendor in order to be processed to a form acceptable to the state Medicaid agency, and thereafter transferred. Such transfer of data from processor 38 to central server can be immediately after each transaction or at desired times in batch mode. The transmitted data may reside on the processor 38 for some amount of time, or until erased or otherwise removed, in order to act as a backup should an error occur either during data transfer or downstream of the processor 38. As updates to the system are needed, they are transmitted to the processor 38 from the central processor (or other appropriate site) without the need for a technician to visit each kiosk 10. All data transmissions are appropriately encrypted and/or employ other appropriate security measures in order to assure data integrity and safety as well as to protect the system resident within the processor 38.

The variable height interactive kiosk 10 allows users B to apply for, change, examine, etc., Medicaid benefits through the use of a relatively simple interactive system that has an onscreen facilitator employing ladder logic to help such users B with a live counselor on standby for difficult situations. The variable height interactive kiosk 10 allows a user B to traverse the system at the beneficiary's own pace without being rushed by a person working on a fixed fee per user basis. As the system is software driven, each user's experience for a give component is equivalent in that each user is given the exact same information for a given situation based on the programming of the system. For example, every user who inquires about the providers in a given MCO will be given the exact same list, which may not be the case with a human counselor who may accidentally miss one or more provider's names when giving out such information. Any system changes are performed centrally (for example at the state Medicaid office) and simultaneously dispatched remotely to each kiosk 10. The variable height interactive kiosk 10 allows the user's application to be submitted to the appropriate agency for processing in real time and with a high degree of certainty of receipt. Should a subcomponent of the overall application system fail, the variable height interactive kiosk 10 provides a level of redundancy so that such failures can be cured immediately upon identification of the failure, possibly without the user B ever knowing of the failure.

While the invention has been particularly shown and described with reference to an embodiment thereof, it will be appreciated by those skilled in the art that various changes in form and detail may be made without departing from the spirit and scope of the invention.

We claim:

1. A kiosk comprising:
   a housing having a top, a bottom, and a front face;
   a bracket attached to the housing and capable of sliding along the front face between the top and the bottom;
   a drive motor located within the housing, the drive motor having a drive pulley such that the drive motor becomes operational upon a rotational force being introduced onto the drive pulley and the drive motor deactivates upon removal of the rotational force upon the drive pulley;
   a driven pulley located within the housing;
   a linkage passing over the drive pulley and the driven pulley such that the bracket is attached to the linkage and such that when the bracket is slid between the top and the bottom, the bracket moves the linkage which transfers a force to the drive pulley in order to activate the motor;
   a communication device held within the bracket;
   at least one reader located on the bracket;
   a processor located within the housing in communication with an input device and the reader; and
   a software system resident on the processor, which software system allows navigation through a Medicaid entry process by the collection of a data set, such that upon completion of the navigation through the Medicaid entry process, the data set is transferred by the processor to a remote site.

2. The kiosk as in claim 1 wherein the bracket is capable of tilting away from and toward the front face.

3. The kiosk as in claim 1 wherein the communication device comprises a monitor or a keyboard.

4. The kiosk as in claim 1 wherein the communication device, the at least one reader and the processor are each powered by a solar panel.

5. The kiosk as in claim 1 wherein the reader comprises a magnetic card swiper.

6. The kiosk as in claim 5 wherein the reader further comprises a biometric reading device.

7. The kiosk as in claim 1 wherein the processor communicates with the remote site via an air card.

8. The kiosk as in claim 1 wherein the software system uses an onscreen navigator to facilitate the navigation.

9. The kiosk as in claim 8 wherein the onscreen navigator uses an interactive video using ladder logic and data collection.

10. The kiosk as in claim 1 further comprising a telephone attached to the housing.

11. The kiosk as in claim 1 further comprising a camera located on the bracket in communication with the processor.

12. A kiosk comprising:

a housing having a top, a bottom, and a front face;

a bracket attached to the housing and capable of sliding along the front face between the top and the bottom of the housing and capable of tilting away from and toward the front face;

a drive motor located within the housing, the drive motor having a drive pulley such that the drive motor becomes operational upon a rotational force being introduced onto the drive pulley and the drive motor deactivates upon removal of the rotational force upon the drive pulley;

a driven pulley located within the housing;

a linkage passing over the drive pulley and the driven pulley such that the bracket is attached to the linkage and such that when the bracket is slid between the top and the bottom, the bracket moves the linkage which transfers a force to the drive pulley in order to activate the motor;

a touch screen monitor and a keyboard each device held within the bracket;

a magnetic card swiper located on the bracket;

a biometric reading device located on the bracket;

a processor located within the housing in communication with the monitor, the keyboard, the card swiper, and the biometric reading device; and a software system resident on the processor, which software system allows navigation through a Medicaid entry process by the collection of a data set, such that upon completion of the navigation through the Medicaid entry process, the data set is transferred by the processor to a remote site.

13. The kiosk as in claim 12 wherein the monitor, the keyboard, the magnetic card swiper, the biometric reading device, and the processor are each powered by a solar panel.

14. The kiosk as in claim 12 wherein the processor communicates with the remote site via an air card.

15. The kiosk as in claim 12 wherein the software system uses an onscreen navigator to facilitate the navigation wherein the onscreen navigator uses an interactive video using ladder logic and data collection.

16. The kiosk as in claim 12 further comprising a telephone attached to the housing.

17. The kiosk as in claim 12 further comprising a camera located on the bracket and in communication with the processor.

* * * * *